United States Patent
Wang et al.

(10) Patent No.: US 6,787,195 B2
(45) Date of Patent: Sep. 7, 2004

(54) METHOD OF DEPOSITING A COATING ON SI-BASED CERAMIC COMPOSITES

(75) Inventors: Hongyu Wang, Niskayuna, NY (US); Yuk-Chiu Lau, Ballston Lake, NY (US); Irene Spitsberg, Loveland, OH (US); Arnold T. Henry, Gloversville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,635

(22) Filed: Feb. 3, 2003

(65) Prior Publication Data

US 2004/0151840 A1 Aug. 5, 2004

(51) Int. Cl.[7] .............................. C23C 4/04; C23C 4/10
(52) U.S. Cl. ...................... 427/452; 427/454; 427/455; 427/419.3; 427/419.7
(58) Field of Search .................. 427/452, 454, 427/455, 419.3, 419.7

(56) References Cited

U.S. PATENT DOCUMENTS 3,607,343 A * 9/1971 Longo et al. ............... 428/404

2003/0003328 A1 * 1/2003 Spitsberg et al. ........... 428/698

FOREIGN PATENT DOCUMENTS

EP  1 142 850 A1 * 10/2001

* cited by examiner

*Primary Examiner*—Katherine A. Bareford
(74) *Attorney, Agent, or Firm*—David L. Narciso; Gary M. Hartman; Domenica N. S. Hartman

(57) ABSTRACT

A process of depositing a coating system suitable for use as an environmental barrier coating on various substrate materials, particularly those containing silicon and intended for high temperature applications such as the hostile thermal environment of a gas turbine engine. The process comprises depositing a first coating layer containing mullite, and preferably a second coating layer of an alkaline earth aluminosilicate, such as barium-strontium-aluminosilicate (BSAS), by thermal spraying while maintaining the substrate at a temperature of 800° C. or less, preferably 500° C. or less, by which a substantially crack-free coating system is produced with desirable mechanical integrity.

24 Claims, 4 Drawing Sheets

METHOD OF DEPOSITING A COATING ON SI-BASED CERAMIC COMPOSITES

FEDERAL RESEARCH STATEMENT

This invention was made with Government support under NAS3-26385 awarded by NASA. The Government has certain rights in the invention.

BACKGROUND OF INVENTION

1. Field of the Invention

The present invention generally relates to coating systems suitable for protecting components exposed to high-temperature environments, such as the hostile thermal environment of a gas turbine engine. More particularly, this invention is directed to a low-temperature thermal spraying process for depositing an environmental barrier coating system comprising a mullite-containing bond layer and a barium-strontium-aluminosilicate topcoat.

2. Description of the Related Art

Higher operating temperatures for gas turbine engines are continuously sought in order to Increase their efficiency. Though significant advances in high temperature capabilities have been achieved through formulation of iron, nickel and cobalt-base superalloys, alternative materials have been investigated. For example, composite materials are currently being considered for such high temperature applications as combustor liners, vanes, shrouds, airfoils, and other hot section components of gas turbine engines. Of particular interest are silicon-based composites, such as silicon carbide (SIC) as a matrix and/or reinforcing material.

Thermal barrier coatings (TBC's) are widely used on hot section components to reduce their operating temperatures and thermal gradients through the component materials. Hot section components formed of Si-containing materials further benefit from a protective coating capable of inhibiting the major mechanism for degradation of Si-containing materials subjected to corrosive water-containing environments, namely, the formation of volatile silicon monoxide (SiO) and silicon hydroxide ($Si(OH)_4$) products. Consequently, besides low thermal conductivity, a critical requirement of a coating system for a Si-containing material is stability in high temperature environments containing water vapors. Other Important properties for the coating material include a coefficient of thermal expansion (CTE) compatible with the Si-containing material, low permeability to oxidants, and chemical compatibility with the Si-containing material and silica scale formed from oxidation. As a result, protective coatings for gas turbine engine components formed of Si-containing materials must provide environmental protection, and a coating system having this function will be referred to below as an environmental barrier coating (EBC) system.

Various single-layer and multilayer EBC systems have been investigated for use on Si-containing substrates. Coatings of zirconia partially or fully stabilized with yttria (YSZ) as a thermal barrier layer exhibit excellent environmental resistance. However, YSZ does not adhere well to Si-containing materials (SiC or silicon) because of a CTE mismatch (about 10 ppm/° C. for YSZ as compared to about 4.9 ppm/° C. for SiC/SiC composites). Mullite ($3Al_2O_3 \cdot 2SiO_2$), barium-strontium-aluminosilicate (BSAS; ($Ba_{1-x}Sr_x$)O—$Al_2O_3$—$SiO_2$) and other alkaline earth aluminosilicates have been proposed as protective coatings for Si-containing materials. For example, U.S. Pat. No. 5,496,644 to Lee et al. and U.S. Pat. No. 5,869,146 to McCluskey et al. disclose the use of mullite and U.S. Pat. Nos. 6,254,935, 6,365,288, 6,387,456 and 6,410,148 to Eaton et al. disclose the use of BSAS as outer protective barrier coatings for silicon-containing substrates. In the Eaton et al. patents, BSAS barrier coatings are described as being bonded to a silicon-containing substrate with an intermediate layer (bond layer) that may be, among other possible materials, mullite or a mixture of mullite and BSAS.

Lee et al. teach that a plasma-sprayed mullite-containing coating must be deposited on a substrate heated to at least 800° C., more preferably at least 1000° C., in order to ensure that mullite is deposited in its crystalline form. According to Lee et al., shrinkage of mullite during the crystallization of amorphous mullite is the key factor causing cracking and debonding of a mullite coating during thermal cycling. Mullite is said to immediately crystallize as it solidifies on a substrate maintained at the temperatures prescribed by Lee et al., thereby avoiding the transition from amorphous to crystalline phases. McCluskey et al. teach that, by selecting appropriate powder size and spray parameters, the applied mullite coating containing at least 85% by volume of crystalline phase is crack-free if the substrate is heated to a temperature of about 845° C. to about 935° C. In each of the patents to Eaton et al., emphasis is also placed on the importance of thermal spraying mullite and BSAS-containing coatings on a substrate maintained at a sufficiently high temperature to ensure that BSAS is deposited in its monoclinic celsian crystalline phase, which has a CTE closer to SiC/SiC CMC than the amorphous BSAS phase. In U.S. Pat. Nos. 6,254,935 and 6,365,288 to Eaton et al., a substrate temperature of at least 1100° C. is said to be required for the deposition of a mullite-BSAS bonding layer and a BSAS barrier layer. When depositing the BSAS layer, these patents teach that the substrate must be held at at least 1100° C. for a period of at least 15 minutes after deposition to develop greater crystallinity in the BSAS layer and substantially eliminate the formation of cracks. In U.S. Pat. Nos. 6,387,456 and 6,410,148 to Eaton et al. a substrate temperature of at least 870° C. is disclosed as being required when depositing a mullite-BSAS bonding layer and a BSAS barrier layer. In view of the teachings of Lee et al., mullite would be expected to deposit in its crystalline form when thermal sprayed under the temperature conditions taught by the patents to Eaton et al.

A drawback to the teachings of Lee et al., McCluskey et al. and Eaton et al. is that large components are difficult to maintain at such high temperatures during a thermal spray process. Nonetheless, in view of the prevailing wisdom as taught by Lee et al., McCluskey et al. and Eaton et al., mullite and BSAS-containing coatings have been thermal sprayed on substrates maintained at 800° C. or more in order to produce EBC systems with desirable mechanical integrity.

SUMMARY OF INVENTION

The present invention provides a process for depositing a coating system suitable for use as an EBC on various substrate materials, particularly those containing silicon and intended for high temperature applications such as the hostile thermal environment of a gas turbine engine. Examples of such substrate materials include those with a dispersion of silicon carbide, silicon nitride and/or silicon reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials, e.g., SiC/SiC ceramic matrix composites (CMC).

The invention is generally directed to the deposition of mullite-containing and alkaline earth aluminosilicate-containing coatings. For example, the invention is applicable, though not limited, to depositing coating systems of the type disclosed in U.S. Pat. Nos. 6,254,935, 6,365,288, 6,387,456 and 6,410,148 to Eaton et al., and which therefore comprise an outer coating of BSAS and a bond layer of mullite or a mixture of mullite and an alkaline earth aluminosilicate, e.g., BSAS. The process of this invention comprises depositing the bond layer and outer coating by thermal spraying while maintaining the substrate at a temperature of less than 800° C., and preferably less than 500° C., by which an EBC system is produced having desirable mechanical integrity and exhibiting resistance to cracking during thermal cycling.

EBC coatings of this invention can be deposited by thermal spray techniques such as air plasma spray (APS) and low-pressure plasma spray (LPPS), the latter of which is also known as vacuum plasma spraying (VPS). As evidenced by the teachings of Lee et al., McCluskey et al. and Eaton et al., substrate temperatures during thermal spray deposition are known to have a significant effect on the microstructure and mechanical integrity of a thermal sprayed coating. Generally, substrate temperatures affect the amount of thermal stress that occurs as the molten particles impact and solidify onto the substrate during coating deposition, and the amount of cooling stress generated from any thermal expansion mismatch between the coating and substrate materials during subsequent cooling to room temperature. These stresses are mostly tensile in nature and are the cause of through-thickness cracks in the resulting coating if these stresses exceed the tensile strength of the coating materials. Substrate temperature also has an impact on the cooling rate of the coating material after the molten particles are deposited on the substrate, which can result in different crystallinity or phases in the coating. For some coating materials, the thermal expansion coefficient of the crystalline phase is very close to that of the substrate, resulting in lower residual stresses if the coating can be maintained in the crystalline phase after deposition and during subsequent cooling to room temperature.

The above considerations apply to thermal spraying of materials used in EBC coatings, and have lead to the conclusions espoused by Lee et al., McCluskey et al. and Eaton et al. that substrate temperatures in excess of 800° C. are required to reduce the resulting stresses, and by Lee et al. and Eaton et al. that high substrate temperatures are needed to increase the crystallinity of mullite-containing and BSAS-containing coatings, with the benefit being a decrease in the occurrence of cracks upon cooling and during thermal cycling of a coating system containing one or both of these coating materials. In the present invention, particle temperature during deposition is identified as another key parameter that affects the resulting stresses and the crystallinity or phases of these coating materials. In particular, it is theorized that in-flight particle temperature will affect coating crystallinity, and particle temperatures as the particles impact the substrate will affect the resulting stresses. In the present invention, it is believed that the crack-free coatings can be obtained at lower substrate temperatures if adequate steps are taken to reduce the in-flight as well as impact particle temperatures during deposition in order to reduce the resulting stresses and maintain the coating crystallinity, especially in the case of a mullite-containing bond layer. These steps include the use of lower gun power, longer spray distance and larger particle size.

With the present invention, thermal spraying of an EBC system on substrates maintained at temperatures of about 350° C. and less has been proven to be feasible and capable of producing a substantially crack-free coating. The invention is particularly suited to depositing a composite mullite bond layer containing an alkaline earth aluminosilicate, a notable example of which is a mullite-BSAS coating containing, in weight percent, about 80% mullite and about 20% BSAS, on which an alkaline earth aluminosilicate topcoat, preferably BSAS, is then deposited. As a result, the present invention provides a process by which an EBC comprising a mullite-containing layer and BSAS topcoat can be deposited at substrate temperatures far lower than previously thought possible. EBC's containing a mullite-containing bond layer and BSAS topcoat that are deposited at substrate temperatures in accordance with this invention have been shown to exhibit mechanical integrity and microstructures comparable to EBC's deposited at substrate temperatures prescribed by the prior art, e.g., above 800° C.

Other objects and advantages of this invention will be better appreciated from the following detailed description.

DETAILED DESCRIPTION

The present invention is generally applicable to components that operate within environments characterized by relatively high temperatures, and are therefore subjected to severe thermal cycling and stresses, oxidation, and corrosion. Notable examples of such components include combustor components, high pressure turbine vanes, and other hot section components of gas turbine engines, though the invention has application to other components.

Figure 1:
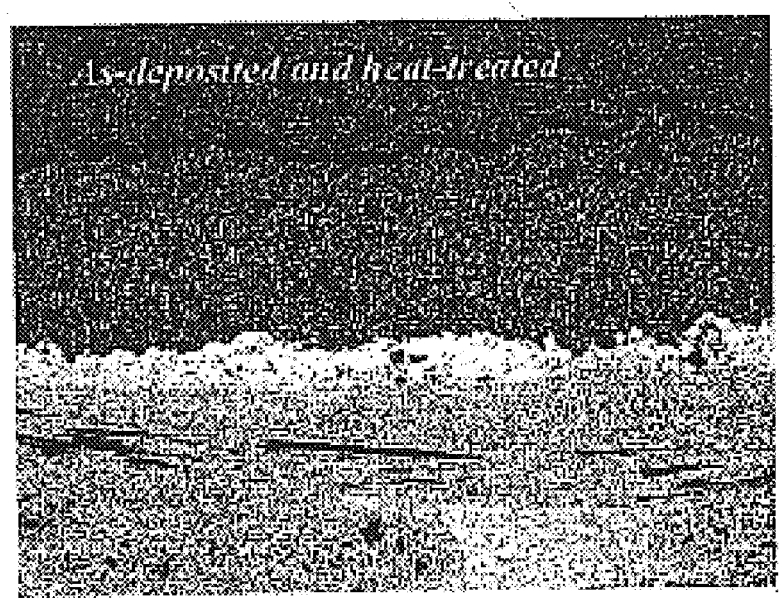
FIG. 1 is a scanned image of a cross-sectional view of an as-deposited environmental barrier coating system deposited in accordance with the present invention.

FIG. 1 is a scanned image of a cross-section of a substrate on which a multilayer EBC system has been deposited. The substrate is a melt-infiltrated (MI) SiC/SiC CMC, though the invention is generally applicable to other materials, including ceramics containing elemental silicon and other silicon compounds as the matrix and/or reinforcement material. The coating system shown in FIG. 1 comprises an environmental barrier topcoat adhered to the substrate with a bond layer, and is representative of coating systems disclosed in U.S. Pat. Nos. 6,254,935, 6,365,288 and 6,410,148 to Eaton et al.

As in Eaton et al., a preferred material for the bond layer is a mixture of mullite and an alkaline earth aluminosilicate, preferably stoichiometric BSAS ($0.75BaO \cdot 0.25SrO \cdot Al_2O_3 \cdot 2SiO_2$). A suitable mullite content for the bond layer is about 50 to about 100 weight percent, preferably about 80 weight percent, with the balance being BSAS. The mullite-BSAS bond layer serves to adhere the topcoat to the Si-containing substrate, while also preventing interactions between the topcoat and the Si-containing substrate at high temperatures. Mullite is a desirable constituent of the bond layer because of Its chemical stability with Si-containing materials at high temperatures. The addition of stoichiometric RSAS to the bond layer is also relatively compatible with the Si-containing substrate in terms of having a CTE of about 5.27 ppm/° C., as compared to a CTE of about 4.9 ppm/° C. for SiC/SiC CMC. A suitable thickness range for the bond layer is about 25 to about 250 micrometers, with a preferred range of about 50 to about 125 micrometers. Also seen in FIG. 1 is an optional silicon layer between the substrate and mullite-BSAS bond layer. In accordance with U.S. Pat. No. 6,299,988 to Wang et al., the inclusion of the silicon layer is useful to improve oxidation resistance of the substrate and enhances bonding of the mullite-BSAS layer to the substrate if the substrate contains SiC or silicon nitride ($Si_3N_4$). A suitable thickness for the silicon layer is about 25 to about 250 micrometers.

The topcoat is intended to provide environmental protection to the underlying substrate, as well as reduce the surface temperature of the substrate and the thermal gradient through the interior layers of the coating system. As in U.S. Pat. No. 6,254,935 and 6,410,148 to Eaton et al., the material for the topcoat is an alkaline earth aluminosilicate, preferably stoichiometric BSAS. A BSAS topcoat provides excellent environmental protection to the substrate and exhibits good thermal barrier properties due to its low thermal conductivity. The BSAS topcoat is also able to serve as an environmental barrier to the underlying mullite-OSAS layer, which as a result of its mullite content can exhibit significant silica activity and volatilization if exposed to water vapor at high temperatures. In addition, the BSAS topcoat also reduces the growth of an interfacial silica layer at the substrate when exposed to the oxidizing environment of a gas turbine engine. Finally, BSAS is physically compliant with a SiC-containing substrate, such as the substrate, and is relatively compatible with the muliite-BSAS bond layer and the Si-containing substrate in terms of CTE. A suitable thickness range for the BSAS topcoat is about 25 to about 1500 micrometers, with a preferred range of about 25 to about 500 micrometers, depending on the particular application.

As with prior art environmental barrier coating systems, the layers of the EBC shown in FIG. 1 can be individually deposited by thermal spray processes, such as APS and LPPS, though it is foreseeable that deposition could be performed by other known thermal spray techniques, such as high velocity oxy-fuel (HVOF). The EBC shown in FIG. 1 was deposited by air plasma spraying. Following deposition, it is conventional to perform a heat treatment to relieve residual stresses created during cooling from elevated deposition temperatures and to crystallize the coatings to their preferred phases.

In accordance with this invention, the EBC shown in FIG. 1 was deposited on a substrate maintained at a temperature not higher than about 350° C., yet the EBC, including its mullite-BSAS bond layer, can be seen to be reasonably dense, crack-free and well adhered to the CMC substrate. To obtain the microstructure seen in FIG. 1, the bond layer and topcoat were deposited and heat treated under the approximate conditions set forth in Table I below. The heat-treated mullite-BSAS bond layer shown in FIG. 1 contains crystalline mullite and BSAS, while the BSAS topcoat contains the monoclinic celsian and hexagonal celsian (hexacelsian) phases, as evidenced by the lower frames of the X-ray diffraction (XRD) plots of FIGS. 3 and 4, respectively. The plasma gun employed was a Model 7MB commercially available from Sulzer Metco. [t1]

TABLE I

| Parameter Feedstock | Bond Layer mullite + BSAS powders | Topcoat BSAS powder |
|---|---|---|
| Feedstock Particle Size | | |
| mullite | −88/+44 micrometers | — |
| BSAS | −88/+22 micrometers | −88/+44 micrometers |
| Plasma Gases | $Ar/H_2$ | $Ar/H_2$ |
| Substrate Temperature | 200 to 350° C. | 250 to 350° C. |
| Gun Stand-off Distance | 3 inches (about 8 cm) | 5 inches (about 13 cm) |
| Gun Power | 35 kW | 25 kW |
| Heat Treatment (all layers) | | |
| Ramp up | 4° C./minute to 1250° C. | 4° C./minute to 1250° C. |
| Soak | 24 hours at 1250° C. | 24 hours at 1250° C. |
| Cooldown | 4° C./minute to RT | 4° C./minute to RT |

The gun power, stand-off distance and feedstock particle size were chosen in an effort to reduce the particle temperatures in the plasma flame as well as when they impacted and deposited on the substrate to form the coating layers. Notably, the crystalline-phase muilite powders used to produce the coating of FIG. 1 contained particles that were significantly larger than that used by U.S. Pat. No. 5,496,644 to Lee et al. (−62/+20 micrometers). Larger particle sizes, in combination with relatively low plasma gun power and relatively long stand-off distances, were used to reduce in-flight as well as impact particle temperatures and inhibit heating of the substrate in accordance with a preferred aspect of this invention. The intent was to minimize the temperature differential between the particles and the substrate, with the desired effect of minimizing thermally-induced stresses within the coatings.

Figure 3:
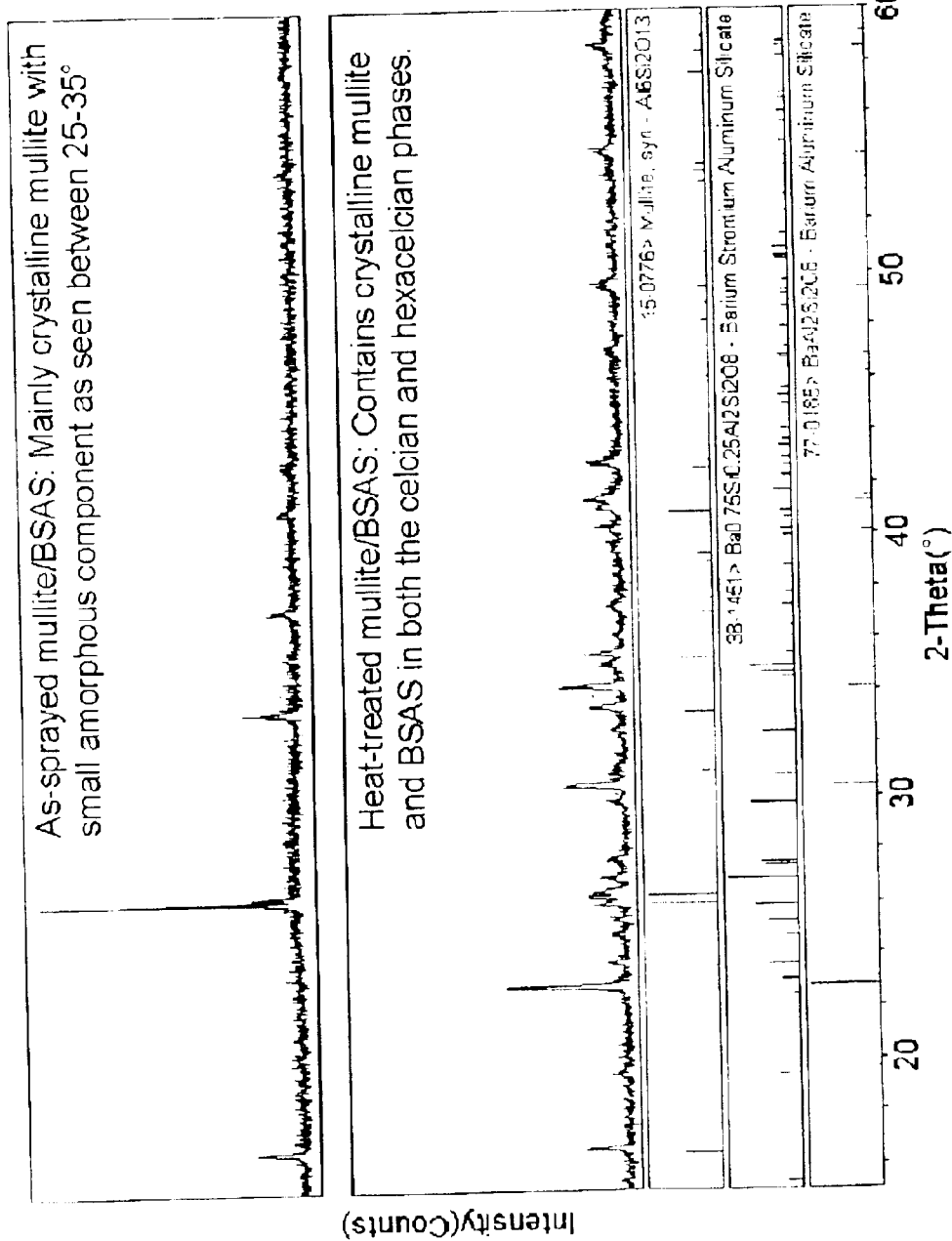
FIG. 3 is an x-ray diffraction plot comparing as-deposited and heat-treated mullite-BSAS bond coatings deposited in accordance with the present invention.
Figure 5:
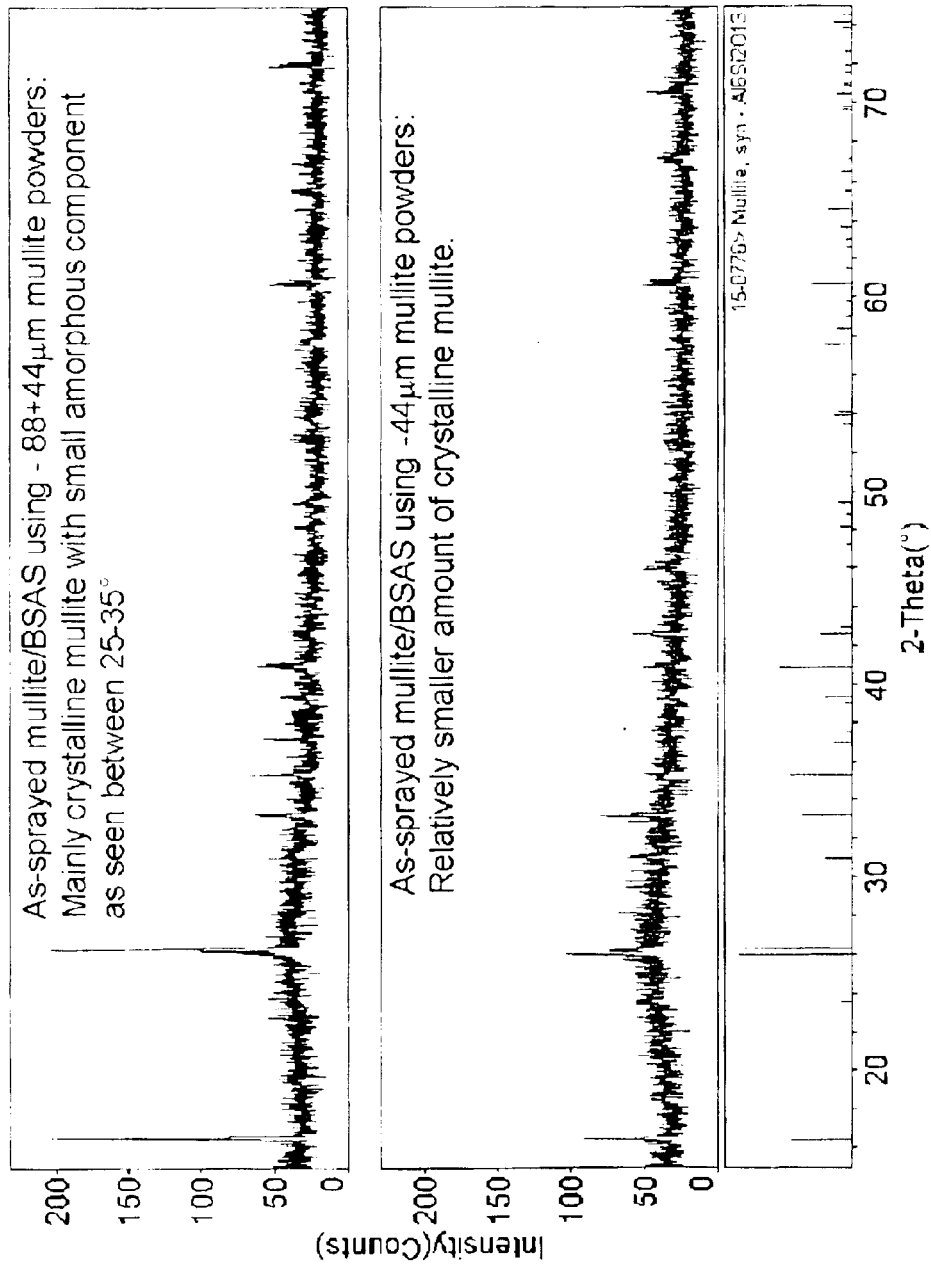
FIG. 5 is an x-ray diffraction plot comparing the as-deposited condition of mullite-BSAS bond coatings deposited from a relatively coarse powder in accordance with the present invention and from a finer powder in accordance with the prior art.

As evidenced by the XRD data in the upper frame of FIG. 3, the as-deposited mullite-BSAS bond layer predominantly contained crystalline mullite with a small amorphous component, which may be attributed to the BSAS content of the layer as well as to the non-equilibrium phase decomposition of mullite. In the heat-treated condition (FIG. 1), the mullite-BSAS bond layer contained crystalline mullite and crystalline BSAS in the monoclinic celsian and hexacelsian phases, as evidenced by the XRD data in the lower frame of FIG. 3. With the combination of coarser mullite particles and lower gun powers of this Invention, it is believed that the in-flight mullite particle temperature during deposition was sufficiently low to prevent complete melting of the particles followed by rapid solidification, which could result in the formation of amorphous phase. With finer mullite particles, such as that used by Lee et al., it is believed that in-flight mullite particle temperature is much higher during deposition, leading to phase decomposition of mullite. This effect can be seen by comparing the XRD data shown in the upper and lower frames of FIG. 5. The upper frame in FIG. 5 shows XRD data for an as-sprayed mullite-BSAS bond layer deposited in accordance with Table 1, including the use of a −88/+44 micrometer mullite powder (the slight difference in XRD peak intensities between FIGS. 3 and 5 was a result of the two samples containing polycrystalline grains of mullite with random crystal orientations). The lower frame in FIG. 5 shows XRD data for an as-sprayed mullite-BSAS bond layer having the same composition and deposited under the same conditions as that of the upper frame in FIG. 5, but deposited from a finer mullite powder having a particle size of less than 44 micrometers. Comparing the upper and lower frames of FIG. 5, one can see that the mullite-BSAS bond layer deposited from the coarser mullite powders predominantly contained crystalline mullite with a small amorphous component in the as-deposited condition, while the mullite-BSAS bond layer deposited from the finer mullite powders contained a smaller amount of crystalline mullite in the as-deposited condition. This difference in crystalline content is believed to be sufficient to have an affect on the propensity for cracks to develop in a mullite-containing coating, such as the mullite-BSAS bond layer of FIG. 1.

From the above, it was concluded that crack-free mullite-containing coatings can be deposited at the lower substrate temperatures of this invention if sufficiently coarser mullite particles, lower gun powers and longer spray distances are used, because the particle temperatures during impact are expected to be relatively lower and the resulting coating will contain a larger amount of mullite crystalline phase whose CTE is very close to that of a CMC substrate. As a result, residual thermal and cooling stresses arising from molten particles impacting and solidifying on the substrate, and from the CTE mismatch during cooling to room temperature, are believed to be substantially reduced to prevent the formation of through-thickness cracks.

Figure 4:
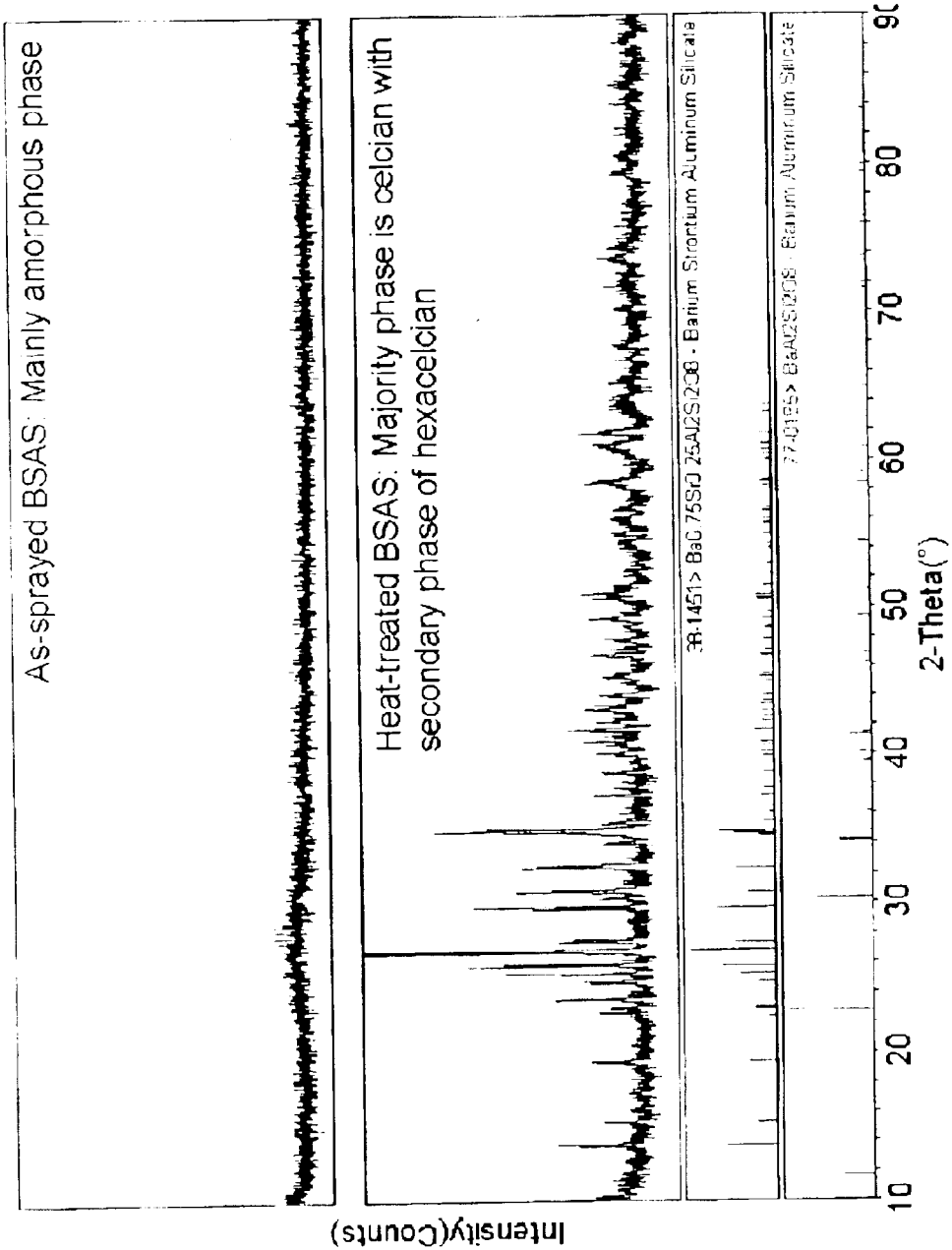
FIG. 4 is an x-ray diffraction plot comparing as-deposited and heat-treated BSAS coatings deposited in accordance with the present invention.

FIG. 4 represents XRD data for the BSAS topcoat of FIG. 1, and evidences that the topcoat was predominantly amorphous in the as-deposited condition but was transformed to the monoclinic celsian and hexacelsian phases during heat treatment. The absence in FIG. 1 of cracks in the BSAS topcoat that would otherwise have been expected to form during this phase transformation was attributed to the reduced residual thermal stresses in the underlying mullite-BSAS bond layer. Accordingly, to avoid through-thickness crack formation in the BSAS topcoat, deposition conditions must be used that will achieve the lower impact particle temperatures and substrate temperatures which, according to the present invention, are believed to be responsible for the reduced residual thermal stresses in the BSAS layer.

Figure 2:
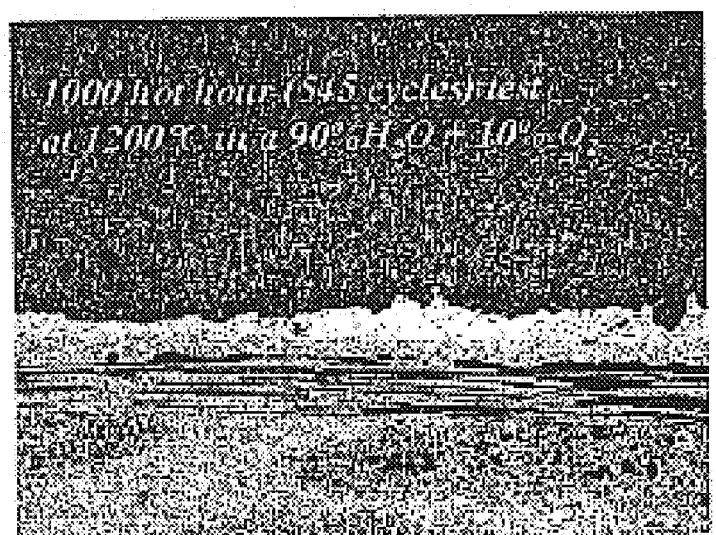
FIG. 2 is a scanned image of a cross-sectional view of an environmental coating system essentially identical to FIG. 1 and following thermal cycling.

A number of specimens that were prepared using the parameters in Table I underwent a high steam cycle furnace (HSCF) test to assess the durability and protective capability of the deposited coating system. During the HSCF test, the specimen was exposed to thermal cycling between room temperature and about 1200° C. over a period of about 1000 hours (about 545 cycles completed) in a flowing atmosphere of about 90% $H_2O$ and about 10% $O_2$. FIG. 2 shows one of the tested specimens in cross-section, from which it can be seen that the coating layers are still intact with no crack development or spallation (though some oxidation of the silicon layer was observed). From these results, it was concluded that the mechanical integrity of the EBC's was comparable to prior art EBC's formed of the same materials but deposited using substrate temperatures in excess of 800° C. Therefore, while the prior art has emphasized the importance of depositing EBC coatings on substrates heated to at least 800° C. in order to avoid thermally-induced stress cracks, the present invention demonstrated that much lower temperatures can be used.

From the above it was concluded that, when depositing a mullite-containing coating alone or in combination with a topcoat, reducing the substrate temperature to about 350° C. and below, e.g., about 100° C., is capable of producing a crack-free coating under appropriate processing conditions. Since a mullite-containing coating deposited in accordance with the invention contains a large amount of crystalline phase that has a similar CTE to that of a CMC substrate, residual cooling stresses are very low, regardless of the substrate temperature. In addition, it is believed that in accordance with the invention, the mullite particle temperatures at impact are also low enough to reduce the thermal stresses between the impacting mullite particles and the substrate so that there is no need to heat the substrate as taught by McCluskey et al. As such, substrate temperature during deposition of a mullite-containing bond layer is not limited to 350° C., and can be as high as 800° C. or more. However, the benefits of this invention are better realized with substrate temperatures that do not require holding the article in a furnace during coating deposition.

When depositing a BSAS topcoat, minimum substrate temperatures of about 150° C. are believed necessary for there to occur localized remelting and bonding of the layers. Since the BSAS coating deposited in accordance with the present invention contains a large amount of amorphous phase that has a larger CTE than the substrate, residual cooling stresses within the topcoat that would lead to the formation of cracks can only be reduced by limiting the substrate temperatures to less than 800° C. However, because furnaces required to achieve high substrate temperatures during coating deposition are not practical for large turbine parts, maximum substrate temperatures of below 500° C. are preferred for the BSAS topcoat.

After deposition, a suitable heat treatment is necessary to transform any amorphous mullite and amorphous BSAS to their crystalline phases. While heat treatments having soak temperatures of about 1250° C. maintained for about twenty-four hours were utilized in the investigation, it is believed that heat treatments in a range of about 1200° C. to about 1400° C. for a duration of about 10 to about 50 hours would yield acceptable results.

From the above, it can be appreciated that, though not wishing to be limited to any particular theory, the crack-free coatings of this invention are believed to have been obtained in part as a result of steps taken to reduce the temperatures of the coating particles as they travel through the plasma flame as well as at impact during deposition. These steps included increased gun stand-off distances, lower gun power levels, and increased particle size. As discussed above with reference to FIG. 5, particle size appears to have a particular influence on crystalline content when depositing a mullite-BSAS bond layer, and this difference in crystalline content is believed to be sufficient to have an affect on the propensity for cracks to develop in a mullite-containing coating as well as a BSAS coating deposited on the mullite-containing coating. It is theorized that the relatively narrow range of particle sizes used in the investigations reported above (−88/+44 micrometers, as compared to the wide range used by McCluskey et al. (−176/+16 micrometers) and the relatively finer particles sizes used by Lee et al. (−62/+20 micrometers)) was able to sufficiently lower particle temperatures and minimize particle temperature variation (i.e., a smaller range of particle temperatures) at impact to the extent that, as a result of lower cooling stresses, substrate temperatures of below about 800° C. were able to be successfully used.

Based on the plasma spray gun stand-off distance and gun power levels employed in the investigation, it is believed that stand-off distances of about 8 to about 9 centimeters and power levels of about 33 to about 35 kW are suitable when depositing a mullite-containing bond layer, and stand-off distances of about 13 to about 14 centimeters and power levels of about 24 to about 25 kW are particularly suitable when depositing a BSAS topcoat on a mullite-containing bond layer. While gun power, stand-off distance and feedstock particle size were the process variables chosen for the investigation, it is foreseeable that other process parameters could be altered and yet obtain the substrate temperature within the ranges set forth above. Therefore, though the invention has been described in terms of a preferred embodiment, it is apparent that other forms could be adopted by one skilled in the art. Accordingly, the scope of the invention is to be limited only by the following claims.

What is claimed is:

1. A method of depositing a coating system on a substrate, the coating system comprising a first coating layer and a second coating layer on the first coating layer so as to be adhered to the substrate with the first coating layer, the first coating layer having a composition containing mullite, the second coating layer consisting essentially of an alkaline earth aluminosilicate, the method comprising the steps of depositing the first coating layer and then depositing the second coating layer by thermal spraying while maintaining the substrate at a temperature of less than 800° C. during the deposition of at least one of the first and second coating layers, wherein the first coating layer contains crystalline mullite immediately following the deposition thereof.

2. A method according to claim 1, wherein the substrate is maintained at a temperature of about 100° C. to less than 500° C. during the step of depositing the first coating layer.

3. A method according to claim 1, wherein the substrate is maintained at a temperature of about 150° C. to less than 500° C. during the step of depositing the second coating layer.

4. A method according to claim 1, wherein the first coating layer is a mixture consisting essentially of mullite and an alkaline earth aluminosilicate.

5. A method according to claim 1, wherein the first coating layer consists of about 80 weight percent mullite and about 20 weight percent alkaline earth aluminosilicate.

6. A method according to claim 5, wherein the alkaline earth aluminosilicate of the first coating layer is barium-strontium-aluminosilicate.

7. A method according to claim 1, wherein the second coating layer consists of barium-strontium-aluminosilicate.

8. A method according to claim 1, further comprising the step of depositing a layer of silicon on the substrate before depositing the first coating layer.

9. A method according to claim 1, wherein the mullite in the first coating layer is predominantly crystalline mullite immediately following the deposition step.

10. A method according to claim 1, wherein the second coating layer contains amorphous barium-strontium-aluminosilicate immediately following the deposition step, the method further comprising the step of heat treating the second coating layer to transform the amorphous barium-strontium-aluminosilicate to crystalline barium-strontium-aluminosilicate.

11. A method according to claim 1, wherein the first coating layer is deposited by plasma spraying a powder with a plasma spray gun, the powder comprising a mullite powder having a particle size range of greater than 44 micrometers to less than 88 micrometers.

12. A method according to claim 11, wherein the powder further comprises an alkaline earth aluminosilicate powder having a particle size range of greater than 22 micrometers to less than 88 micrometers.

13. A method according to claim 11, wherein the first coating layer is deposited with the plasma spray gun positioned about 8 to about 9 centimeters from a surface on which the first coating layer is deposited, and the plasma spray gun is operated at a power level of about 33 to about 35 kW.

14. A method according to claim 1, wherein the second coating layer is deposited by plasma spraying a powder with a plasma spray gun, the powder containing a barium-strontium-aluminosilicate powder having a particle size range of greater than 44 micrometers to less than 88 micrometers, the plasma spray gun being positioned about 13 to about 14 centimeters from a surface of the first coating layer, the plasma spray gun being operated at a power level of about 24 to about 25 kW.

15. A method according to claim 1, wherein the substrate is formed of a material selected from the group consisting of metal matrix composites reinforced with silicon carbide, silicon nitride and/or silicon, composites having a matrix of silicon carbide, silicon nitride and/or silicon, and composites with a silicon carbide, silicon nitride and/or silicon matrix reinforced with silicon carbide, silicon nitride and/or silicon.

16. A method according to claim 1, wherein the substrate is a surface of a gas turbine engine component.

17. A method of forming an environmental barrier coating system on a gas turbine engine component having a substrate region formed of a silicon-containing material, the method comprising the steps of:

plasma spraying a bond layer on the substrate region while maintaining the substrate region at a temperature of below 800° C., the bond layer having a composition containing mullite and barium-strontium-aluminosilicate BSAS and being deposited from a powder mixture comprising a mullite powder containing particles in a size range of greater than 44 micrometers to less than 88 micrometers and a barium-strontium-aluminosilicate powder containing particles in a size range of greater than 22 micrometers to less than 88 micrometers, the bond layer containing amorphous and crystalline mullite phases and amorphous barium-strontium-aluminosilicate phases.

plasma spraying a barrier layer on the bond layer while maintaining the substrate region at a temperature of below 500° C., the barrier layer having a composition predominantly of amorphous barium-strontium-aluminosilicate; and heat treating the bond layer and the barrier layer to transform the amorphous mullite phase of the bond layer to a crystalline mullite phase and to transform the amorphous barium-strontium-aluminosilicate phases of the bond layer and the barrier layer to crystalline barium-strontium-aluminosilicate phases.

18. A method according to claim 17, wherein the substrate region is maintained at a temperature of about 100° C. to about 500° C. during the step of plasma spraying the bond layer.

19. A method according to claim 17, wherein the substrate region is maintained at a temperature of about 150° C. to about 500° C. during the step of plasma spraying the barrier layer.

20. A method according to claim 17, wherein the bond layer is deposited with a plasma spray gun positioned about eight to about nine centimeters from a surface on which the bond layer is deposited, the plasma spray gun being operated at a power level of about thirty-three to about thirty-five kW.

21. A method according to claim 17, wherein the barrier layer is deposited with a plasma spray gun positioned about thirteen to about fourteen centimeters from the bond layer, the plasma spray gun being operated at a power level of about twenty-four to about twenty-five kW.

22. A method according to claim 17, wherein the bond layer consists of about 80 weight percent mullite and about 20 weight percent barium-strontium-aluminosilicate.

23. A method according to claim 17, wherein the barrier layer consists of barium-strontium-aluminosilicate.

24. A method according to claim 17, wherein the heat treating step is performed at a temperature of about 1200° C. to about 1400° C.

* * * * *